Patented Aug. 13, 1929.

1,724,393

UNITED STATES PATENT OFFICE.

STANLEY WALKINGTON CARPENTER, OF CORNWALL, AND GERALD NOEL WHITE, OF LONDON, ENGLAND, ASSIGNORS TO PULP BINDERS DEVELOPMENT COMPANY LIMITED, OF KIMBERLY, SOUTH AFRICA, A COMPANY.

BINDER FOR BINDING AN AGGREGATE AND PROCESS OF MANUFACTURING SAME.

No Drawing. Application filed July 9, 1925, Serial No. 42,594, and in Great Britain July 18, 1924.

This invention relates to the manufacture of binders, more particularly but not exclusively for use in the manufacture of fuel briquettes and the like, but it may also be used for the purpose of holding together any other suitable aggregate desired.

The object of the invention is to provide an improved method of manufacturing a binder for the purpose specified, and an improved method of manufacturing fuel briquettes and the like with the use of the said binder.

The improved binder, according to the invention, is of vegetable origin, and is produced by the natural fermentation in the manner to be described of soft vegetable tissue and the treatment of the material at any stage of the process with alkali. We prefer to use substantially undecomposed soft vegetable tissue because we have found that the properties of the resulting binder are greatly improved if substantially the whole of the non-gaseous products of the fermentation are retained in the mass, and we have also found that where vegetable matter has been allowed to ferment naturally, or in an uncontrolled manner, considerable quantities of these valuable fermentation products of pectus origin are generally lost. The retention and use of substantially the whole of these products forms an essential part of our improved process but it should be noted that the use of such partly fermented soft vegetable tissue as may still possess the required properties and the completion with them of the process to be described would not fall outside the scope of the present invention. The fermentation is an aerobic one and is allowed to proceed until the substantial degradation of the material has occurred, care being taken that substantially the whole of the nongaseous products of fermentation are retained. This may be accomplished in various ways, some of which will be described hereinafter and form part of the invention and at any suitable stage of the process the material is treated with a solution of a suitable alkali, preferably by boiling. If desired the finished binder may be dried for export, transport or the like and reconditioned later by the addition of water accompanied by kneading, working or the like. The bacteria which effect the degradation of the cellulose tissue of the vegetable material under treatment comprise a number of types of soil bacteria the most important being *Spirochæte cytophaga*.

We do not desire to be limited by any theoretical explanations of the process forming the subject of the present invention, but for the sake of clearness and to assist in clearly distinguishing the present invention from certain other processes which have been proposed, we desire to give what we believe to be the correct explanation of the improved results obtained. In the following explanation and description therefore the term "humus" is to be understood as including ulmins, vegetable mucus or mixtures thereof, while plant tissue is regarded as consisting of cellulose and pectin, these terms being used in a wide sense to cover the various grades of homologous or closely allied substances such as lignopecto- and muco-celluloses known to science.

Now it is believed according to the invention that we concentrate pectin and its decomposition products, such as pectic acid and its salts, together with certain pentosans known collectively as mucus, not by removal of the cellulosic constituents of the original tissue in a substantially unchanged condition but by the conversion by fermentation of a portion of these constituents in situ into a secondary auxiliary agglutinant, that is to say the above mentioned ulmins and ulmic acids. Such a mixture of the fermentative decomposition products of cellulose and pectin known to science as humus is produced when plant tissue undergoes a process of rotting in the course of nature, but under these conditions there is a certain loss of the products of fermentation and more especially the products of pectous origin.

In our process the raw material is fermented under such conditions and with such precautions as prevent the substantial loss of any but the gaseous products and after or before fermentation it is treated preferably at or about 100° C. with a suitable quantity (usually between 1% and 5% of the dry weight of the pulp) of alkaline carbonate or hydroxide. The alkali treatment which effects dispersion of the humus takes place most rapidly when the mass is heated to about 100° C. The final product should show a slight alkaline reaction.

It is to be noted that the humus content may be controlled by varying the period of fermentation, since within limits the longer the fermentation the greater will be the content of humus due to the conversion of cellulose into ulmic compounds.

Several preferred methods of carrying out the invention will now be described.

For the purpose of manufacturing the improved binder soft vegetable tissues that is to say nonwoody or nonlignitic material of any description may be used, such for example as straw, water weeds, cactus, prickly pear, rushes, grasses, bagasse, beet sugar residues, flax residues, soya bean waste, bracken leaves, sisal, hemp waste, banana or maize leaves and stems, and waste from potato and other crops and the like, and for the reasons stated we prefer these to be substantially undecomposed.

The raw material is placed or stacked on suitable areas, preferably level, so that the soluble constituents that tend to drain off will be retained. If desired any suitable artificial means for retaining and collecting these constituents may be employed. In any case provision is made for the admission of air to the stack. It is advisable to place thin layers of already fermented vegetation of the same or a different type at various heights in the stack. The vegetation is allowed to ferment until such time as the fibrous structure of the original material has undergone substantial degradation which will occur at any time within a few weeks to many months provided the mass remains appreciably damp to obtain which either water or preferably the liquors which drain from the mass are sprinkled on it in any suitable manner, thus retaining the soluble pectin constituents. The desired fermentation being aerobic in character the introduction of air into the mass by any suitable means is advantageous and one method of obtaining this is by watering the mass by fully or nearly completely aerated water or above mentioned drain liquor. When fully rotted the mass is boiled for a suitable period which may be 5 or 10 minutes only with the addition of water if necessary together with a suitable quantity of sodium carbonate or hydroxide usually between 1% and 5% of its dry weight which treatment converts it into an almost structureless slime with strong agglomerant properties. In this state it is used for agglomerating purposes, such as the manufacture of briquettes either alone or in conjunction with known binding agents. It may also as previously mentioned be dried for transport and brought again by moistening and working or kneading into a pulp condition before use.

It is known that processes have been established for the production of manure by the rotting of straw or other waste vegetable matter in the presence of soluble nitrogen compounds in definite concentrations. The products from this known process may be applied to our purpose after the above mentioned treatment with alkaline carbonate or hydroxide and irrespective of the presence or otherwise of substanaces of a fertilizing value, and give excellent results as agglomerants provided no serious loss of mucus has occurred in preparation that is to say the liquid products of fermentation have not been allowed to run away.

In a specific case, dried grass was laid on the ground to form a layer about 8 inches thick and about 20 square feet in area. The layer was sprinkled with 15 gallons of water containing 2⅓ ozs. of ammonium nitrate. A second layer of dried grass was then placed on top of the first and similarly treated. A stack 12 feet in height was thus built up by superimposed layers of treated grass.

The stack was then allowed to ferment for four months and was occasionally wetted with water or drainings from the stack and turned over. At the end of the period it was found to consist of 203 lbs. of fermented material containing 88 lbs. of dry matter. A hundredweight of the fermented material was then placed in a mortar mill with 1⅔ lbs. of anhydrous sodium carbonate and milled for 15 minutes, the desired product being thus obtained. In utilizing the product for the manufacture of briquettes, twenty pounds of the alkaline material was added to 100 lbs. of coal and the mixture milled for 10 minutes. At the end of this time the mixing being complete, the mixture was charged into an ovoid briquette machine and briquetted without heating.

Another process of manufacture which gives equally good results is carried out as follows:—

The raw vegetable matter is macerated for such a time and in such a manner as to cause the separation of the fibres without unduly shortening their length, that is to say, the fibres are crushed, bruised or split rather than chopped. The mass is then treated by boiling for about 24 hours with a solution of caustic soda or sodium carbonate, the weight of either alkali added being usually between 1 and 5% of the dry weight of the vegetable matter. The alkaline pulp is then allowed to ferment in a container, preferably at temperatures between 35° and 60° C. by the action of soil bacterial organisms until the fibres have been largely attacked or broken down and the mass has become viscous and slimy. This change may be facilitated by repeated mixing or turning over to obtain aerobic conditions.

As a further alternative part of the alkaline carbonates or hydroxides may be added before or during fermentation and the remainder after fermentation and during the boiling process.

In a specific case, one hundredweight of dry grass was boiled for 24 hours in water. The liquors were then drained away and the fibrous residue was passed through a suitable machine until sufficiently bruised or crushed. The mass was then placed in a shallow wooden tray and watered with 2 gallons of water containing 2¼ lbs. of sodium carbonate.

After mixing the mass was allowed to stand and was turned over once in every 24 hours with the sprinkling on of water, i. e., that drained off from the previous boiling operation, sufficient to counterbalance evaporation and to maintain the mass in a stiff pasty condition. Natural fermentation set in soon after the pulp was placed in the tray, but was aided by adding about 2 lbs. of rotten fruit. After 24 days the preparation was sampled and trial briquettes were made therefrom upon the qualities of which the binder was deemed to be ready for use in agglomerating about 10 cwt. of coal.

If desired the alkaline carbonate or hydroxide referred to in the above described processes may be in part replaced by their calcium or other alkaline earth equivalents, for example equal parts of alkali and alkaline earth may be employed.

The amount of binder varies; usually between 4% and 8% of binder is sufficient.

The amount of binder used also depends upon the grading of the coal as to particle size. Within wide limits of grading satisfactory briquettes can be made but by repeated experiment we have found that we get the best results when we have present between 20% and 30% of fine matter, for instance between 100 and 200 mesh. This is different from the conditions obtaining when other binders, such as pitch, are used, in which case increase in the quantity of fines usually increases the quantities of binders required for briquetting.

The methods of application of the binder may be illustrated by the following examples. In these use is made of the so-called "mixing ratio", that is to say, the amount of binder added is not stated as a percentage of the weight of the total mixture but as the weight of dry binder added to 100 parts of fuel or material to be agglomerated.

(1) 100 parts of suitably pulverized fuel which may be bituminous coke, non-bituminous coal, anthracite duff, gas-works coke breeze, lignite, low temperature residue from coal or lignite, smoke-box char and so forth, are intimately mixed with a weight of wet binder equivalent to 6 parts of dry binder prepared according to any of the above methods.

If the binder, on analysis, is found to be abnormally high in ash, that is to say, to contain inorganic matter amounting to more than 15% in the case of binder derived from rotted vegetation the weight of binder taken should be reduced accordingly.

The weight of the wet binder used will vary, but it will usually be about 30 parts for a dry weight or mixing ratio of 6. After complete mixing in any suitable form of distintegrator, edge runner mill, Pfleiderer type mixer or ball mill, the coal or other fuel mixed with binder is heated directly or indirectly with steam and pressed while still in a heated condition at a pressure of 1 to 3 tons per square inch. At the moment of pressing, the mixture of coal and binder should be distinctly moist, preferably so as to allow a small expression of water when the full pressure is applied but in some forms of press a drier mixture may be used and if care is taken with the manner in which the pressure is applied and with the type of mould used very wet mixtures can be briquetted.

Having now described our invention, what we claim as new and desire to secure by Letters Patent is:—

1. The method of manufacturing a binder from soft vegetable tissue, which consists in the step of subjecting such vegetable tissue to the action of a natural aerobic fermentation agent until fully rotted, moistening the mass of tissue during the fermentation, retaining in the mass all the fermentation products other than gaseous products, and treating the mass with a solution of 1 to 5% of an alkali to give the final product a slightly alkaline reaction, whereby a substantially structureless slime is produced, having strong agglomerative properties.

2. A method of manufacturing a binder as claimed in claim 1 in which the step of fermentation is effected first and the mass is then boiled with the alkali solution.

3. The modification of the method of manufacturing a binder as claimed in claim 1, in which the alkali is replaced in part by an alkaline solution of an alkaline earth compound.

4. The method of manufacturing a binder from soft vegetable tissue, which consists in the step of subjecting such vegetable tissue to the action of a natural aerobic fermentation agent until fully rotted, moistening the mass of tissue during the fermentation with an aerated liquid, retaining in the mass all the fermentation products other than the gaseous products, boiling the mass and treating the mass with a solution of 1 to 5% of an alkali to give the final product a slight alkaline reaction, whereby a substantially structureless slime is produced having strong agglomerative properties.

In testimony whereof we have signed our names to this specification.

STANLEY WALKINGTON CARPENTER
GERALD NOEL WHITE.